United States Patent [19]

Shieh et al.

[11] Patent Number: 6,153,684

[45] Date of Patent: *Nov. 28, 2000

[54] PERFORMANCE CARBON BLACKS

[75] Inventors: Chiuna-Huei Shieh, Lexington, Mass.; Kenneth W. Babcock, Borger, Tex.; Gino Panciroli, Ravenna, Italy; John M. Branan, Amarillo, Tex.; Roscoe W. Taylor, Abbotsford, Australia

[73] Assignee: Cabot Corporation, Boston, Mass.

[*] Notice: This patent issued on a continued prosecution application filed under 37 CFR 1.53(d), and is subject to the twenty year patent term provisions of 35 U.S.C. 154(a)(2).

[21] Appl. No.: 07/969,244

[22] Filed: Feb. 12, 1993

Related U.S. Application Data

[63] Continuation-in-part of application No. 07/574,046, Aug. 29, 1990, abandoned.

[30] Foreign Application Priority Data

Aug. 2, 1991 [WO] WIPO ................... PCT/US91/05442

[51] Int. Cl.$^7$ ..................................................... C09C 1/48
[52] U.S. Cl. ....................................... 524/495; 423/449.1
[58] Field of Search .......................... 423/449.1; 524/495

[56] References Cited

U.S. PATENT DOCUMENTS

| | | | |
|---|---|---|---|
| 3,922,335 | 11/1975 | Jordan et al. | 423/449.1 |
| 3,944,392 | 3/1976 | Hunt | 423/450 |
| 5,110,576 | 5/1992 | Soeda et al. | 423/449.1 |
| 5,230,878 | 7/1993 | Nakai et al. | 423/449.1 |

FOREIGN PATENT DOCUMENTS

| | | | |
|---|---|---|---|
| 61-34072 | 2/1986 | Japan | 423/449.1 |
| 2-308867 | 12/1990 | Japan . | |
| 7-754 | 12/1990 | Japan . | |
| 91/10618 | 7/1991 | WIPO . | |
| 91/12202 | 8/1991 | WIPO . | |

*Primary Examiner*—Steven Bos
*Assistant Examiner*—Stuart L. Hendrickson

[57] ABSTRACT

Carbon blacks having a CTAB of greater than 155 m$^2$/g; an I$_2$No. of greater than 180 mg/g; a N$_2$SA of greater than 160 m$^2$/g; a Tint value of greater than 145%; a CDBP of 90–105 cc/100 g; a DBP of 115–140 cc/100 g; a ΔDBP (ΔDBP= DBP–CDBP) of 20–35 cc/100 g; a ΔD50 of less than 40 nm; a Dmode of 40–65 nm; ΔD50/Dmode ratio of 0.55–0.67; and an ASTM Aggregate Volume less than 137,000 (nm)$^3$. Also disclosed are rubber compositions containing the carbon blacks which exhibit superior handling and cornering performance properties, increased abrasion resistance and improved traction.

10 Claims, 2 Drawing Sheets

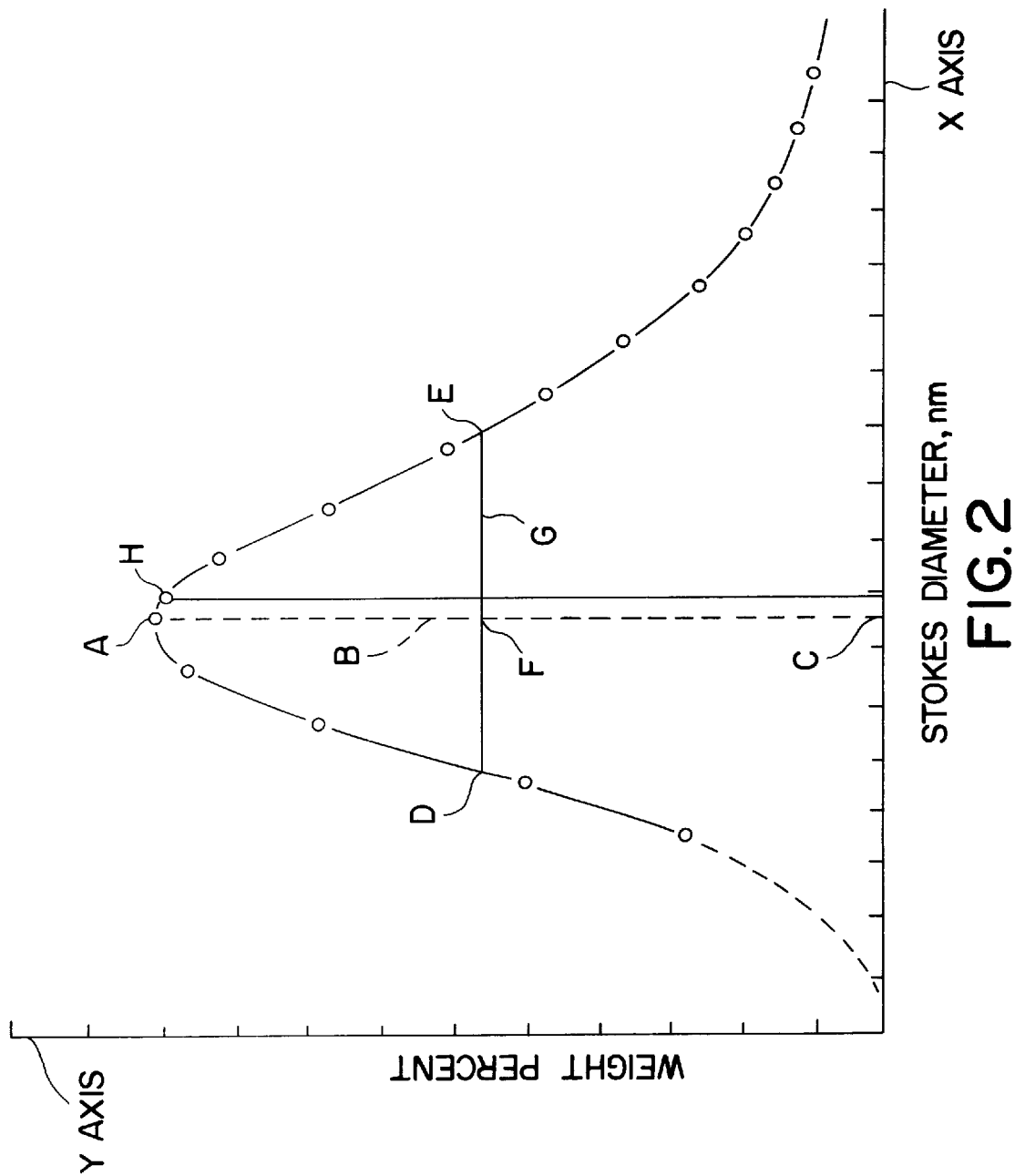

PERFORMANCE CARBON BLACKS

This application is a continuation-in-part of U.S. patent application Ser. No. 07/574,046 filed Aug. 29, 1990, now abandoned.

FIELD OF THE INVENTION

The present invention relates to a class of new and novel furnace carbon blacks which are suitable for various applications and particularly well suited for use in rubber compositions.

BACKGROUND

Carbon blacks are generally produced in a furnace-type reactor by pyrolyzing a hydrocarbon feedstock with hot combustion gases to produce combustion products containing particulate carbon black.

Carbon blacks may be utilized as pigments, fillers, reinforcing agents and for a variety of other applications. For example, carbon blacks are widely utilized as fillers and reinforcing pigments in the compounding and preparation of rubber compositions. Most importantly, carbon blacks are effective in the preparation of rubber vulcanizates intended for usage in preparing tires.

It is generally desirable in the production of high performance tires to utilize carbon blacks which produce tires with satisfactory handling and cornering properties, abrasion resistance, and traction (wet and dry skid resistance). It is particularly desirable to produce carbon blacks capable of imparting improved properties of these types for use in high performance and racing tires.

Accordingly, one object of the present invention is the production of new carbon blacks which impart improved handling and cornering, increased abrasion resistance and improved traction properties to natural rubbers, synthetic rubbers and blends of natural and synthetic rubbers incorporating the carbon blacks.

Another object of the present invention is new rubber compositions, advantageous for use as high performance and racing tires, incorporating the new carbon blacks.

Other objects of the present invention will become apparent from the following description and the claims.

SUMMARY OF THE INVENTION

We have discovered new carbon blacks having a CTAB (cetyl-trimethyl ammonium bromide absorption value) of greater than 155 $m^2/g$ (square meters per gram), an Iodine number ($I_2No.$) of greater than 180 mg/g, a Tint value of greater than 145%, a $N_2SA$ (nitrogen surface area) of greater than 160 $m^2/g$, a CDBP (crushed dibutyl phthalate number) of 90–105 cc/100 g, a DBP (dibutyl phthalate number) of 115–140 cc/100 g, a $\Delta DBP$ ($\Delta DBP = DBP-CDBP$) of 20–35 cc/100 g, a $\Delta D50$ of less than 40 nm (nanometers), a Dmode of 40–65 nm, $\Delta D50$/Dmode ratio of 0.55–0.67 and an ASTM Aggregate Volume less than 137,000 $(nm)^3$. Preferably, the carbon blacks have a CTAB of 160–210 $m^2/g$, an $I_2No.$ of 190–260 mg/g, a Tint Value of 145–170%, a $N_2SA$ of 190–280 $m^2/g$, a $\Delta D50$ of 25–35 nm and an ASTM Aggregate Volume of 50,000–120,000 $(nm)^3$.

We have also discovered a new class of rubber compositions containing the carbon blacks.

The carbon blacks of the present invention may be produced in a furnace carbon black reactor having a first (combustion) zone, a transition zone, and a reaction zone. A carbon black yielding feedstock is injected in any manner known to the art, into a hot combustion gas stream. The resultant mixture of hot combustion gases and feedstock passes into the reaction zone. Optionally, the mixture of hot combustion gases and feedstocks is cooled, without pyrolysis being stopped, by a first quench located in the reaction zone. Pyrolysis, of the carbon black yielding feedstock, is stopped by quenching the mixture when the carbon blacks of the present invention have been formed. Preferably pyrolysis is stopped by a quench injecting a quenching fluid. When the carbon blacks of the present invention are produced utilizing a process that employs a first quench for cooling the mixture of combustion gases and feedstock, the first quench is located upstream of the second quench that stops pyrolysis. The process for preparing the novel carbon black of the present invention will be described in greater detail hereinafter.

The rubbers for which the novel carbon black of this invention are effective as reinforcing agents include natural and synthetic rubbers. Generally, amounts of the carbon black product ranging from about 10 to about 250 parts by weight can be used for each 100 parts by weight of rubber in order to impart a significant degree of reinforcement thereto. It is, however, preferred to use amounts varying from about 20 to about 100 parts by weight of carbon black per 100 parts by weight of rubber and especially preferred is the utilization of from about 40 to about 80 parts of carbon black per 100 parts of rubber.

Among the rubbers suitable for use with the present invention are natural rubber and its derivatives such as chlorinated rubber; copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinylpyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and penetene-1; particularly preferred are the ethylene-propylene copolymers wherein the ethylene content ranges from 20 to 90 percent by weight and also the ethylene-propylene polymers which additionally contain a third monomer such as dicyclopentadiene, 1,4-hexadiene and methylene norbornene.

An advantage of the carbon blacks of the present invention is that the carbon blacks impart improved handling and cornering properties, increased abrasion resistance and improved traction to compositions containing natural rubbers, synthetic rubbers or blends thereof in which the carbon blacks of the present invention are incorporated.

An advantage of the rubber compositions of the present invention is that the rubber compositions are particularly well suited for use as high performance and racing tires.

Other advantages of the present invention will become apparent from the following more detailed description of the invention.

BRIEF DESCRIPTION OF THE DRAWINGS

FIG. 2 is a sample histogram of the Stokes diameter of the aggregates of a carbon black sample versus the relative frequency of their occurrence in a given sample.

DETAILED DESCRIPTION OF THE INVENTION

Figure 1:
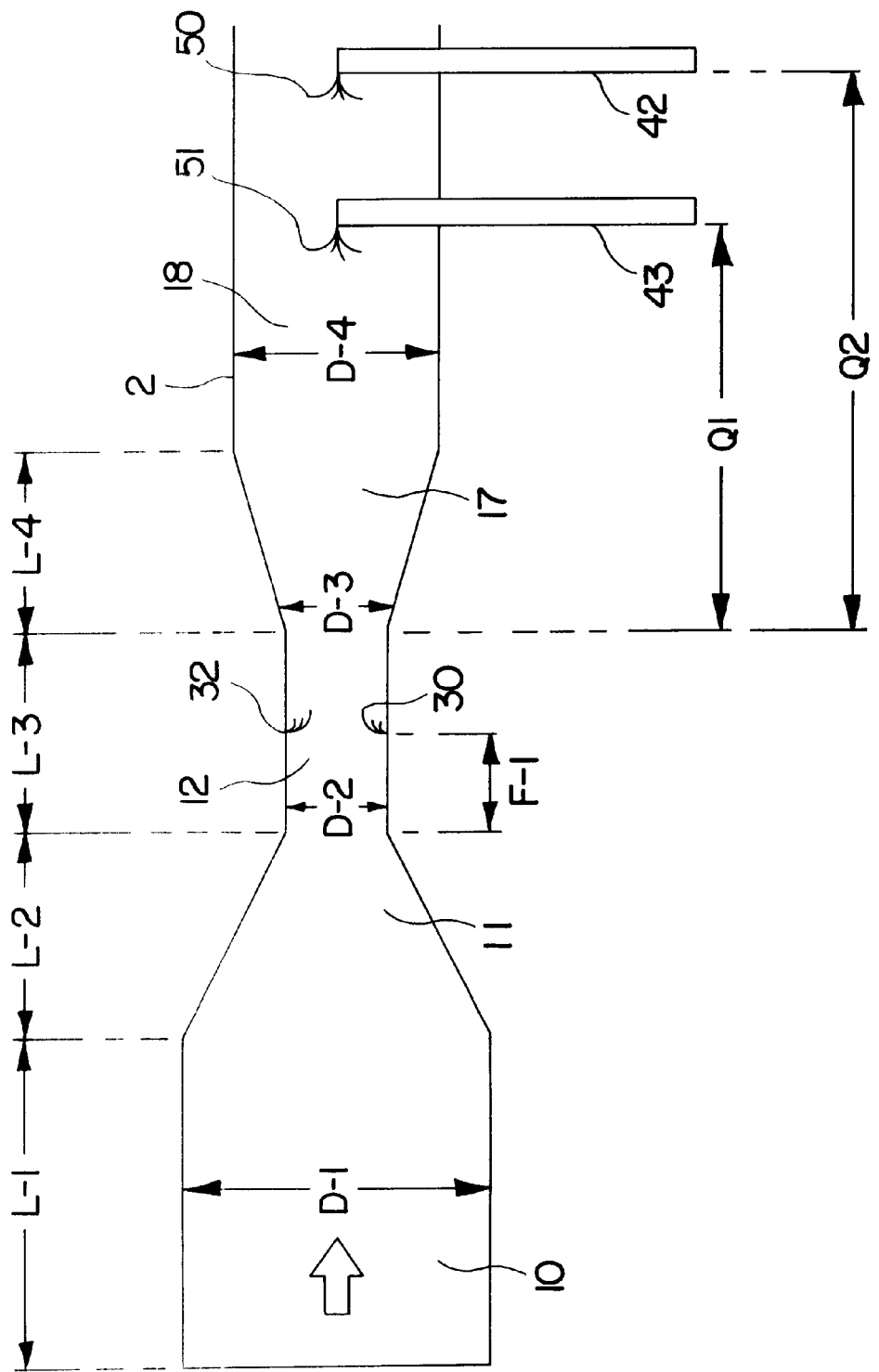
FIG. 1 is a cross-sectional view of a portion of one type of furnace carbon black reactor which may be utilized to produce the carbon blacks of the present invention.

The carbon blacks of the present invention are characterized by having a CTAB of greater than 155 m$^2$/g, preferably 160–210 m$^2$/g; an I$_2$No. of greater than 180 mg/g, preferably 190–260 mg/g; a Tint value of greater than 145%, preferably 145–170%; a N$_2$SA of greater than 160 m$^2$/g, preferably 190 to 280 m$^2$/g; a CDBP of 90–105 cc/100 g; a DBP of 115–140 cc/100 g; a ΔDBP (ΔDBP=DBP−CDBP) of 20–35 cc/100 g; a ΔD50 of less than 40 nm, preferably 25–35 nm; a Dmode of 40–65 nm; ΔD50/Dmode ratio of 0.55–0.67; and an ASTM Aggregate Volume less than 137,000 (nm)$^3$, preferably 50,000–120,000 (nm)$^3$.

The carbon blacks of the present invention may be produced in a modular, also referred to as "staged", furnace carbon black reactor. A section of a typical modular furnace carbon black reactor which may be utilized to produce the carbon black of the present invention is depicted in FIG. 1. Other details of a typical modular furnace carbon black reactor may be found for example in the description contained in U.S. Pat. No. 3,922,335, the disclosure of which is herein incorporated by reference.

Referring to FIG. 1, the carbon blacks of the present invention may be produced in a furnace carbon black reactor 2, having a combustion zone 10, which has a zone of converging diameter 11, transition zone 12, and reaction zone 18. The end of the reaction zone 18 nearest the transition zone 12 has a zone of diverging diameter 17. The diameter of the combustion zone 10, up to the point where the zone of converging diameter 11, begins is shown as D-1; the diameter of zone 12, as D-2; the diameter of zone 17 at the narrowest point as D-3 and the diameter of zone 18, as D-4. The length of the combustion zone 10, up to the point where the zone of converging diameter, 11, begins is shown as L-1; the length of the zone of converging diameter, 11, is shown as L-2; the length of the transition zone, 12, is shown as L-3; and the length of the zone of diverging diameter, 17, is shown as L-4.

To produce the carbon blacks of the present invention hot combustion gases are generated in combustion zone 10, by reacting a liquid or gaseous fuel with a suitable oxidant stream such as air, oxygen, mixtures of air and oxygen or the like. Among the fuels suitable for use in reacting with the oxidant stream in combustion zone 10, to generate the hot combustion gases are included any of the readily combustible gas, vapor or liquid streams such as natural gas, hydrogen, carbon monoxide, methane, acetylene, alcohols, or kerosene. It is generally preferred, however, to utilize fuels having a high content of carbon-containing components and in particular, hydrocarbons. The ratio of air to natural gas utilized to produce the carbon blacks of the present invention may be from about 10:1 to about 20:1. To facilitate the generation of hot combustion gases, the oxidant stream may be preheated.

The hot combustion gas stream flows downstream from zones 10 and 11 into zones 12, 17 and then 18. The direction of the flow of hot combustion gases is shown in the figure by the arrow. Carbon black-yielding feedstock 30, is introduced at point 32 (located in zone 12). Suitable for use herein as carbon black-yielding hydrocarbon feedstocks, which are readily volatilizable under the conditions of the reaction, are unsaturated hydrocarbons such as acetylene; olefins such as ethylene, propylene, butylene; aromatics such as benzene, toluene and xylene; certain saturated hydrocarbons; and volatilized hydrocarbons such as kerosenes, naphthalenes, terpenes, ethylene tars, aromatic cycle stocks and the like.

The distance from the end of the zone of converging diameter 11, to point 32, is shown as F-1. In each of the examples described herein carbon black-yielding feedstock 30, was injected radially in the form of a plurality of jets which penetrate into the interior regions of the hot combustion gas stream to insure a high rate of mixing and shearing of the hot combustion gases and the carbon black-yielding feedstock so as to rapidly and completely decompose and convert the feedstock to the novel carbon black of the present invention.

The mixture of carbon black-yielding feedstock and hot combustion gases flows downstream through zones 12 and 17 into zone 18. Optionally, a first quench 41, located at point 43 and injecting a quenching fluid 51, may be utilized to cool the mixture of carbon black-yielding feedstock and hot combustion gases without stopping pyrolysis. Q$_1$ is the distance from the beginning of zone 17 to quench point 43, and will vary according to the position of the quench. This optional first quench 41 was utilized in the carbon black production run described in Example 4 herein. In Example 4, the quenching fluid was water. Quench 40, located at point 42, injecting quenching fluid 50, which in Examples 1–4 was water, is utilized to stop pyrolysis of the carbon black-yielding feedstock when the novel carbon blacks of the present invention are formed. Point 42 may be determined in any manner known to the art, for selecting the position of a quench to stop pyrolysis. One method for determining the position of the quench to stop pyrolysis is by determining the point at which an acceptable toluene extract level for the novel carbon blacks of the present invention is achieved. Toluene extract level may be measured by using ASTM Test D1618–83 "Carbon Black Extractables-Toluene Discoloration". Q$_2$ is the distance from the beginning of zone 17 to quench point 42, and will vary according to the position of the quench.

After the mixture of hot combustion gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter. This separation may be followed by pelletizing using, for example, a wet pelletizer.

The following testing procedures are used in the determination and evaluation of the analytical properties of the carbon blacks of the present invention, and the physical properties of the rubber compositions incorporating the carbon blacks of the present invention.

CTAB of the carbon blacks was determined according to ASTM Test Procedure D3765–85. Iodine adsorption number of the carbon blacks (I$_2$No.) was determined according to ASTM D1510. Tinting strength (Tint) of the carbon blacks was determined according to ASTM Test Procedure D3265–85a. The Nitrogen Surface Area (N$_2$SA) of the carbon blacks was determined according to the procedure set forth in ASTM D3037–88. The CDBP (Crushed Dibutyl Phthalate) of the carbon black pellets was determined according to the procedure set forth in ASTM D 3493–86. The DBP of the carbon black pellets was determined according to the procedure set forth in ASTM D2414. The ASTM Aggregate volume of the carbon blacks was determined in accordance with ASTM Test Procedure D3849 following dry carbon blacks dispersion procedure A.

Dmode, and ΔD50 of the carbon blacks were determined in the following manner. A histogram is made of the Stokes diameter of the aggregates of the carbon black sample versus the relative frequency of their occurrence in a given sample. As shown in FIG. 2, a line (B) is drawn from the peak (A) of the histogram in a direction parallel to the Y axis to and ending at the X-axis at point (C) of the histogram. The midpoint (F) of the resultant line (B) is determined and a line (G) is drawn through the midpoint (F) thereof parallel to the X-axis. Line (G) intersects the distribution curve of the histogram at two points D and E. The absolute value of the difference of the two Stokes diameters of the carbon black particles at points D and E is the ΔD 50 value.

The data used to generate the histogram are determined by the use of a disk centrifuge such as the one manufactured by Joyce Loebl Co. Ltd. of Tyne and Wear, United Kingdom. The following procedure is a modification of the procedure described in the instruction manual of the Joyce Loebl disk centrifuge file reference DCF 4.008 published on Feb. 1, 1985, the teachings of which are hereby incorporated by reference, and was used in determining the data.

The procedure is as follows. 10 mg (milligrams) of a carbon black sample are weighed in a weighing vessel, then added to 50 cc of a solution of 10% absolute ethanol and 90% distilled water which is made 0.05% NONIDET P-40 surfactant (NONIDET P-40 is a registered trademark for a surfactant manufactured and sold by Shell Chemical Co.). The resulting suspension is dispersed by means of ultrasonic energy for 15 minutes using Sonifier Model No. W 385, manufactured and sold by Heat Systems Ultrasonics Inc., Farmingdale, N.Y.

Prior to the disk centrifuge run the following data are entered into the computer which records the data from the disk centrifuge:

1. The specific gravity of carbon black, taken as 1.86 g/cc;

2. The volume of the solution of the carbon black dispersed in a solution of water and ethanol, which in this instance is 0.5 cc.;

3. The volume of spin fluid, which in this instance is 10 cc of water;

4. The viscosity of the spin fluid, which in this instance is taken as 0.933 centipoise at 23 degrees C.;

5. The density of the spin fluid, which in this instance is 0.9975 g/cc at 23 degrees C.;

6. The disk speed, which in this instance is 8000 rpm;

7. The data sampling interval, which in this instance is 1 second.

The disk centrifuge is operated at 8000 rpm while the stroboscope is operating. 10 cc of distilled water are injected into the spinning disk as the spin fluid. The turbidity level is set to 0; and 1 cc of the solution of 10% absolute ethanol and 90% distilled water is injected as a buffer liquid. The cut and boost buttons of the disk centrifuge are then operated to produce a smooth concentration gradient between the spin fluid and the buffer liquid and the gradient is monitored visually. When the gradient becomes smooth such that there is no distinguishable boundary between the two fluids, 0.5 cc of the dispersed carbon black in aqueous ethanol solution is injected into the spinning disk and data collection is started immediately. If streaming occurs the run is aborted. The disk is spun for 20 minutes following the injection of the dispersed carbon black in aqueous ethanol solution. Following the 20 minutes of spinning, the disk is stopped, the temperature of the spin fluid is measured, and the average of the temperature of the spin fluid measured at the beginning of the run and the temperature of the spin fluid measured at the end of the run is entered into the computer which records the data from the disk centrifuge. The data is analyzed according to the standard Stokes equation and is presented using the following definitions:

Carbon black aggregate—a discrete, rigid colloidal entity that is the smallest dispersible unit; it is composed of extensively coalesced particles;

Stokes diameter—the diameter of a sphere which sediments in a viscous medium in a centrifugal or gravitational field according to the Stokes equation. A non-spherical object, such as a carbon black aggregate, may also be represented in terms of the Stokes diameter if it is considered as behaving as a smooth, rigid sphere of the same density, and rate of sedimentation as the object. The customary units are expressed in nanometer diameters.

Mode (Dmode for reporting purposes)—The Stokes diameter at the point of the peak (Point-A of FIG. 2 herein) of the distribution curve for Stokes diameter.

Median Stokes diameter—(Dst for reporting purposes) the point on the distribution curve of Stokes diameter where 50% by weight of the sample is either larger or smaller. It therefore represents the median value of the determination.

The abrasion data of the rubber compositions were determined using an abrader which is based on a Lambourn type machine. Abrasion rates (cubic centimeter/centimeter travel) were measured at 7%, 13% and 21% slip. The slip is based on the relative velocity between the sample wheel and grindstone. In the following examples, the abrasion index is the ratio of the abrasion rate of a control composition containing VULCAN 9 carbon black, a trademarked product of Cabot Corporation, Waltham, Mass. divided by the abrasion rate of a composition produced using a specified carbon black of the present invention, at the same slip.

The modulus, tensile and elongation of the rubber compositions were measured by the procedure set forth in ASTM D412.

The Shore A Hardness of the rubber compositions was determined according to the procedure set forth in ASTM D-2240-86.

Rebound data were determined an all rubber samples utilizing a ZWICK Rebound Resilience Tester, Model 5109, manufactured by Zwick of America, Inc., Post Office Box 997, East Windsor, Conn. 06088. Instructions for determining the rebound values accompany the instrument.

The dynamic mechanical properties of the rubber compositions were determined in a manner well known to those of ordinary skill in the art, using an Instrom Model 1350 Servohydraulic System interfacing with a Digital Equipment Corporation Minc-23 computer for data manipulation. The specimen tested for each of the rubber compositions consisted of a sandwich type test specimen comprising four pieces of each rubber composition, each piece having the dimensions 30 mm by 30 mm by 6 mm thick. The dynamic mechanical properties measured were complex modulus (G*), elastic modulus (G'), and loss modulus (G"), with tangent delta (tan delta) being equal to loss modulus divided by elastic modulus (tan delta=G"/G'). The viscoelastic properties of the carbon black reinforced rubber compositions were measured at 70 C, 1 Hertz, and two strains, 0.5% DSA and 40% DSA.

The effectiveness and advantages of the present invention will be further illustrated by the following examples.

EXAMPLES 1–4

Four examples of the novel carbon blacks of the present invention were prepared in a reactor generally described herein, and as depicted in FIG. 1, utilizing the reactor conditions and geometry set forth in Table 2. The fuel utilized in the combustion reaction in each of the examples was natural gas. The liquid feedstock utilized in each of the examples had the properties indicated in Table 1 below:

TABLE 1

| Feedstock Properties | | |
|---|---|---|
| | Examples 1–3 | Example 4 |
| Hydrogen/Carbon Ratio | 0.94 | 0.94 |
| Hydrogen (wt. %) | 7.28 | 7.24 |
| Carbon (wt. %) | 92.2 | 92.2 |
| Sulfur (wt. %) | 0.5 | 0.4 |
| A.P.I. Gravity 15.6/15.6 C(60)F [ASTM D-287] | −2.3 | −1.6 |
| Specific Gravity 15.5/15.6 C(60)F [ASTM D-287] | 1.096 | 1.089 |
| Viscosity, SUS (54.4° C.) [ASTM D-88] | 102.1 | 84.3 |
| Viscosity, SUS (98.9° C.) [ASTM D-88] | 40.6 | 42.1 |
| BMCI (Visc-Grav) | 140 | 132 |

The reactor conditions and geometry are set forth in Table 2 below.

TABLE 2

| | CARBON BLACKS | | | |
|---|---|---|---|---|
| | Ex. 1 | Ex. 2 | Ex. 3 | Ex. 4 |
| D-1, in. | 7.25 | 7.25 | 7.25 | 7.25 |
| D-2, in. | 4.5 | 4.5 | 4.5 | 4.5 |
| D-3, in. | 6 | 6 | 6 | 6 |
| D-4, in. | 9 | 9 | 9 | 9 |
| L-1, in. | 24 | 24 | 24 | 24 |
| L-2, in. | 12 | 12 | 12 | 12 |
| L-3, in. | 9 | 9 | 9 | 9 |
| L-4, in. | 18 | 18 | 18 | 18 |
| F-1, in. | 4.5 | 4.5 | 4.5 | 4.5 |
| $Q_1$, in. | * | * | * | 18 |
| $Q_2$, in. | 30 | 108 | 54 | 144 |
| Oil Inj Pt. 32, ) Tips # × Size, in.) | 6 × 0.025 | 6 × 0.025 | 6 × 0.020 | 6 × 0.020 |
| Oil Rate 32, gph | 128 | 142 | 115 | 109 |
| Oil Press. 32, psig | 556 | 670 | 754 | 680 |
| Oil Preheat, 32, F. | 362 | 355 | 324 | 300 |
| Comb.Air, kscfh | 106 | 106 | 106 | 106 |
| Comb.Air Preheat, F. | 1040 | 1040 | 1031 | 1000 |
| Natural Gas, kscfh | 8.94 | 8.90 | 9.72 | 9.4 |
| Air/Burn Gas Ratio | 9.85 | 9.85 | 9.85 | 9.8 |
| K+, gK+/100 gal oil | 0 | 0 | 0 | 1.75 |
| $Q_1$ Press., psi | * | * | * | 150 |
| $Q_1$ H$_2$O rate, gph | * | * | * | 85 |
| $Q_2$ Press., psi | 145 | 119 | 150 | 185 |
| Temp. at $Q_1$, F. | * | * | * | 2641 |
| Temp. at $Q_2$, F. | 1350 | 1350 | 1350 | 1350 |

Inj. = injection; Comb. = combustion; Press. = pressure
32 = Point 32 on FIG. 1; gph = gallons/hour;
psi = pounds/square inch; in. = inches; ft. = feet; F = degrees Fahrenheit; kscfh = standard cubic feet/hour, in 1000's
K+= potassium; gK+/100 gal oil = grams K+/100 gallons-feedstock (oil)
* First Quench ($Q_1$) not utilized The carbon blacks produced in Examples 1–4 were then analyzed according to the procedures described herein. The analytical properties of the blacks produced, after wet pel- letizing and drying, and of a reference carbon black are shown in Table 3:

TABLE 3

| | Carbon Blacks | | | | |
|---|---|---|---|---|---|
| | Ex.1 | Ex.2 | Ex.3 | Ex. 4 | VULCAN 9 |
| CTAB (m$^2$/g) | 182 | 162 | 196 | 205 | 122 |
| I$_2$No. (mg/g) | 198 | 206 | 250 | 257 | 142 |
| N$_2$SA (m$^2$/g) | 197 | 197 | 255 | 269 | 130 |
| DBP (cc/100 g) | 127 | 133 | 123 | 123 | 114 |
| CDBP (cc/100 g) | 102 | 100 | 99 | 94 | 94 |
| ΔDBP (cc/100 g) | 25 | 33 | 24 | 29 | 19 |
| Tint (%) | 161 | 154 | 163 | 152 | 126 |
| Agg. Vol. (nm)$^3$ | 106,772 | 106,129 | 82,251 | 56,224 | 254,005 |
| Dmode (nm) | 50 | 58 | 50 | 44 | 82 |
| Δ D50 (nm) | 30 | 34 | 32 | 28 | 58 |
| ΔD50/Dmode | 0.60 | 0.59 | 0.64 | 0.64 | 0.71 |

VULCAN 9 = VULCAN 9 Carbon Black, VULCAN is a registered trademark for carbon blacks manufactured and sold by Cabot Corporation, Waltham, Massachusetts.

EXAMPLE 5

This Example illustrates the use of the novel carbon blacks of the present invention in rubber compositions in comparison with a rubber composition containing VULCAN 9 carbon black. Rubber composition A was made with the carbon black of the present invention produced in Example 1. Rubber composition B was made with the carbon black of the present invention produced in Example 2. Rubber composition C was made with the carbon black of the present invention produced in Example 3. Rubber composition D was made with the carbon black of the present invention produced in Example 4. Rubber composition E was made with VULCAN 9 carbon black. Rubber compositions A, B, C, D and E were prepared incorporating each of the carbon black samples according to the rubber formulation shown below in Table 4.

TABLE 4

| SYNTHETIC RUBBER FORMULATION | |
|---|---|
| INGREDIENT | Part by weight |
| SBR 1712 | 89.38 |
| CIS-1,4 BR | 35.00 |
| Carbon Black | 65.00 |
| Oil (Sundex 790) | 10.62 |
| Zinc Oxide | 3.00 |
| Sunproof Improved Stabilizer | 2.50 |
| Wingstay 100 | 2.00 |
| Stearic Acid | 2.00 |
| N-cyclohexyl-2-benzothiazolesulfenamide | 1.50 |
| 2-mercaptobenzothiazole | 0.20 |
| Sulfur | 1.75 |

SBR 1712 = an oil extended styrene-butadiene copolymer having a content of 23.5% styrene and 76.5% butadiene.
CIS 1,4 BR = a polybutadiene rubber
Sundex 790 = ASTM D2226, Type 101 oil
Sunproof Improved Stabilizer = a stabilizer
Wingstay 100 = mixed diaryl p-phenylenediamine The static properties of these rubber compositions were then evaluated according to the ASTM procedures described herein. The results were as shown in Table 5:

TABLE 5

| Rubber Composition | Modulus 300% El (psi) | Tensile (psi) | $El_b$* (%) | Shore A Hardness |
|---|---|---|---|---|
| A | 1263 | 3090 | 570 | 64 |
| B | 1106 | 3168 | 626 | 55 |
| C | 1087 | 3332 | 662 | 59 |
| D | 1091 | 3109 | 595 | 66 |
| E | 1063 | 2994 | 627 | 59 |

*$El_b$ = elongation at break;
psi = pounds/square inch

These results show that the static properties of the rubber compositions A, B, C and D, produced with the carbon blacks of the present invention, are comparable to those of rubber composition E produced with the reference carbon black.

The abrasion index of each rubber composition was also determined as described herein. The results were as shown in Table 6:

TABLE 6

| Rubber Composition | 7% Slip | 13% Slip | 21% Slip |
|---|---|---|---|
| A | 118.5 | 112.1 | 112.8 |
| B | 127.8 | 118.8 | 108.1 |
| C | 122.0 | 106.6 | 104.6 |
| D | 122.0 | 106.3 | 88.7 |
| E | 100 | 100 | 100 |

The abrasion index data show that rubber compositions A, B, C and D, containing the carbon blacks of the present invention, exhibit improved abrasion resistance as compared with rubber composition E incorporating the control carbon black, with the exception of composition D at the 21% slip level for which we have no explanation.

The dynamic mechanical properties of the rubber compositions were also evaluated at 1 Hertz, 70 C, as described herein and the results were as shown in Table 7;

TABLE 7

DYNAMIC MECHANICAL PROPERTIES AT 70° C., 1 Hz

| | G*(MPa) 0.5% DSA | G*(MPa) 40% DSA | Tan Del 40% DSA | Tan Del MAX | ΔG*(MPa) |
|---|---|---|---|---|---|
| A | 6.35 | 1.70 | 0.190 | 0.221 | 4.65 |
| B | 6.02 | 1.67 | 0.185 | 0.231 | 4.35 |
| C | 5.64 | 1.24 | 0.223 | 0.271 | 4.40 |
| D | 7.48 | 0.84 | 0.198 | 0.242 | 6.64 |
| E | 4.21 | 1.29 | 0.151 | 0.202 | 2.92 |

ΔG* = G*(0.5% DSA) - G*(40% DSA)

G*, the dynamic complex modulus, represents the cornering and handling stiffness of a rubber tire tread composition. High cornering and handling stiffness is important for high performance and racing tire treads.

The above results show that the G* values for the rubber compositions A, B, C and D, containing the carbon blacks of the present invention, are higher than that of the rubber composition E, containing the control carbon black, at various strain levels. Therefore the rubber compositions A, B, C and D generally demonstrate improved cornering and handling stiffness as compared to rubber composition E.

High traction is another very important parameter for high performance and racing tires. High hysteresis is necessary for imparting high traction. As shown in Table 7, the tan delta values of compounds A, B, C and D are significantly higher than the tan delta value of compound E. In addition, compounds A, B, C and D show significantly higher ΔG* than that of compound E. High ΔG* value is beneficial for high traction. All these results indicate that the carbon blacks of the present invention impart significant improvement in traction to the rubber compositions in which they are incorporated, in comparison with conventional carbon blacks.

It should be clearly understood that the forms of the present invention herein described are illustrative only and are not intended to limit the scope of the invention.

We claim:

1. A carbon black having a CTAB of greater than 155 $m^2/g$; an $I_2$No. of greater than 180 mg/g; a $N_2$SA of greater than 160 $m^2/g$; a Tint value of greater than 145%; a CDBP of 90–105 cc/100 g; a DBP of 115–140 cc/100 g; a ΔDBP (ΔDBP=DBP–CDBP) of 20–35 cc/100 g; a ΔD50 of less than 40 nm; a Dmode of 40–65 nm; ΔD50/Dmode ratio of 0.55–0.67; and an ASTM Aggregate Volume less than 137,000 $(nm)^3$.

2. The carbon black of claim 1 wherein the CTAB is 160–210 $m^2/g$, the $I_2$No. is 190–260 mg/g, the $N_2$SA is 190–280 $m^2/g$, the Tint value is 145–170%, the ΔD50 is 25–35 nm and the ASTM Aggregate Volume is 50,000–120,000 $(nm)^3$.

3. The carbon black of claim 1 wherein the Tint value is greater than 150%; the CDBP is 95–105 cc/100 g; the Dmode is 45–65 nm; and the ΔD50/Dmode ratio is 0.57–0.65.

4. The carbon black of claim 3 wherein the CTAB is 160–200 $m^2/g$, the $I_2$No. is 190–260 mg/g, the Tint value is 150–170%, the ΔD50 is 25–35 nm and the ASTM Aggregate Volume is 70,000–120,000 $(nm)^3$.

5. The carbon black of claim 1 wherein the CTAB is 182 $m^2/g$, the $I_2$No. is 198 mg/g, the Tint value is 161%, the ΔD50 is 30 nm and the ASTM Aggregate Volume is 106,772 $(nm)^3$.

6. The carbon black of claim 1 wherein the CTAB is, 162 $m^2/g$, the $I_2$No. is 206 mg/g, the Tint value is 154%, the ΔD50 is 34 nm and the ASTM Aggregate Volume is 106,129 $(nm)^3$.

7. The carbon black of claim 1 wherein the CTAB is 196 $m^2/g$, the $I_2$No. is 250 mg/g, the Tint value is 163%, the ΔD50 is 32 nm and the ASTM Aggregate Volume is 82,251 $(nm)^3$.

8. The carbon black of claim 1 wherein the CTAB is 205 $m^2/g$, the $I_2$No. is 257 mg/g, the Tint value is 152%, the ΔD50 is 28 nm and the ASTM Aggregate Volume is 56,224 $(nm)^3$.

9. A rubber composition comprising about 100 parts, by weight, of a rubber and from about 10 to about 250 parts, by weight, of a carbon black having a CTAB of greater than 155 $m^2/g$; an $I_2$No. of greater than 180 mg/g; a $N_2$SA of greater than 160 $m^2/g$; a Tint value of greater than 145%; a CDBP of 90–105 cc/100 g; a DBP of 115–140 cc/100 g; a ΔDBP (ΔDBP=DBP–CDBP) of 20–35 cc/100 g; a ΔD50 of less than 40 nm; a Dmode of 40–65 nm; ΔD50/Dmode ratio of 0.55–0.67; and an ASTM Aggregate Volume less than 137,000 $(nm)^3$.

10. The rubber composition of claim 9 wherein the CTAB of the carbon black is 160–210 $m^2/g$, the $I_2$No. of the carbon black is 190–260 $m^2/g$, the Tint value of the carbon black is 145–170%, the ΔD50 of the carbon black is 25–35 nm and the ASTM Aggregate Volume of the carbon black is 50,000–120,000 $(nm)^3$.

* * * * *